United States Patent [19]

Lion et al.

[11] Patent Number: 5,402,346
[45] Date of Patent: Mar. 28, 1995

[54] SYSTEM FOR THE CALCULATION OF AT LEAST ONE VEHICULAR TRAFFIC CHECK PARAMETER

[75] Inventors: Didier Lion, Clamart; Eric de Poulpiquet, Paris, both of France

[73] Assignee: Thomson CSF, Courbevoie, France

[21] Appl. No.: 112,842

[22] Filed: Aug. 25, 1993

[30] Foreign Application Priority Data

Sep. 15, 1992 [FR] France ................................ 92 10965

[51] Int. Cl.⁶ .............................................. G06F 15/70
[52] U.S. Cl. .................................... 364/436; 364/437; 364/438; 340/933; 340/934; 342/454
[58] Field of Search ............... 364/436, 437, 438, 562, 364/576, 726; 340/933, 934, 935, 936, 937; 342/454, 455, 456

[56] References Cited

U.S. PATENT DOCUMENTS

| | | | |
|---|---|---|---|
| 3,876,946 | 4/1975 | La Clair et al. | 325/363 |
| 4,317,117 | 2/1982 | Chasek | 342/53 |
| 4,947,354 | 8/1990 | Hethuin | 364/562 |
| 5,161,107 | 11/1992 | Mayeaux et al. | 364/436 |
| 5,283,573 | 2/1994 | Takatou et al. | 340/937 |

FOREIGN PATENT DOCUMENTS

| | | |
|---|---|---|
| 0080397 | 6/1983 | European Pat. Off. |
| 3810357 | 10/1989 | Germany . |
| 1185056 | 3/1970 | United Kingdom . |
| 1315533 | 5/1973 | United Kingdom . |

OTHER PUBLICATIONS

Smit et al., 'Static Radar Sensors for Observation and Control of Inland Vessel Traffic', Int'l Conf:Radar 87 Oct. 1987, N.Y., US pp. 292–296.

Primary Examiner—Kevin J. Teska
Assistant Examiner—Susan Wieland
Attorney, Agent, or Firm—Meltzer, Lippe, Goldstein et al.

[57] ABSTRACT

This invention comprises a system for calculating at least one vehicular traffic check parameter. The system according to the invention includes a pulse modulated radar placed at a high point at the side of the lanes to be monitored. The radar emits pulses having a frequency $f_o$ and width $\tau$ according to a radiation diagram. The radiation diagram is narrow in plan and sufficiently wide in elevation to cover all lanes to be monitored, and inclined in elevation and plan such that at least one range bin of the radar is included in a lane. Echo signals received by the radar are then processed by a signal processing module and a parameter extraction module. The invention is particularly useful in automobile traffic, for calculation of the number of vehicles travelling in lanes, the vehicles speed and length, etc. The advantage of the this inventive system compared with previous systems is that it enables simultaneous checking of several traffic lanes.

9 Claims, 5 Drawing Sheets

SYSTEM FOR THE CALCULATION OF AT LEAST ONE VEHICULAR TRAFFIC CHECK PARAMETER

BACKGROUND OF THE INVENTION

This invention consists of a system for the calculation of at least one vehicular traffic check parameter.

This invention is particularly applicable to all types of automobile vehicles (cars, trucks, etc.) travelling on all sorts of roads (motorways, interstate roads, state roads, etc.). However we will see that the system in the invention can also check river and sea traffic, or objects passing along a robotized line. Thus the term vehicle refers equally well to cars, trucks, motor cycles, boats, objects, etc.

In the specific field of automobile vehicles, an attempt is made to do a traffic analysis at a specific point in order to deduce a number of parameters. The parameters in which we are interested are particularly:

- the number of vehicles travelling on each lane during a pre-defined time interval;
- the speed of these vehicles;
- the average and harmonic speed of a set of vehicles;
- the percentage of trucks;
- the occupancy ratio in each lane, . . . .

At the present time three main techniques are used for the analysis of road and motorway traffic:

The first very widely used technique is to place induction loops under the road. Field variations induced in these loops determine whether or not a vehicle has passed.

The main advantage of this technique is the fact that induction loops work under all climatic conditions, both during the day or night. However it is difficult and expensive to install these induction loops, and it is difficult or even impossible to perform any maintenance. Furthermore, it is difficult to do more than count vehicles.

The second technique still at the prototype stage consists of using video cameras and processing the captured pictures. It is very easy to install these cameras on masts, but performances are not very conclusive: video cameras do not have the advantage of working under all climatic conditions, and are also very dependent on luminosity conditions. Moreover the algorithms used in picture processing are complex and require high computing capacity.

Finally the third known technique consists of installing a fixed continuous wave radar, for example on a bridge infrastructure, and detecting vehicles and their speed using the Doppler effect.

This type of technique, in which associated processing can extract various parameters concerning vehicular traffic (speed, length) is described, for example, in U.S. Pat. No. 4,985,705.

Although the continuous wave radar satisfies compactness, ease of installation and day and night operation requirements and is independent of climatic conditions, it can only check a single traffic lane. Therefore one radar is necessary for each lane in a 6 to 8 lane motorway. The total cost of a traffic analysis system based on this technique thus increases when the zone to be monitored contains several lanes.

SUMMARY OF THE INVENTION

The purpose of this invention is to compensate for the above disadvantages and to satisfy the recent demand for more and more information when checking a specific area that may contain several two-way traffic lanes, for example a motorway.

More specifically the purpose of this invention is a system for the calculation of at least one parameter for checking vehicular traffic travelling on at least two traffic lanes, wherein it comprises:

A pulse modulated radar placed on a side that is not common to the lanes and overlooking the lanes by a predetermined height h, said radar emitting pulses at a given carrier frequency $f_o$ with a pulse width $\tau$, in accordance with a radiation diagram with a small radiation angle in plan, and a sufficiently large angle in elevation to cover said lanes, and positioned at an elevation angle $\alpha_s$ and a plan angle $\alpha_g$, the values $\tau$, $\alpha_s$ and $\alpha_g$ being chosen such that at least one range bin of said radar is included in a lane, said radar also receiving echo signals;

A signal processing module comprising a sampler-encoder of the said received echo signals, means for calculating the Fourier transform of an integer number N of temporal samples originating from the sampler-encoder for each range bin corresponding to a lane, a smoothing filter smoothing the amplitude of frequency samples obtained from said calculating means, and means for comparing the amplitude of samples output from the smoothing filter with a given threshold to detect the passage of vehicles on each lane;

A module for extraction of said parameter from the output from comparison means and samples output from the filter;

BRIEF DESCRIPTION OF THE DRAWINGS

The invention and its advantages will be better understood by reading the following description with reference to the figures in the appendix.

DESCRIPTION OF THE PREFERRED EMBODIMENT

Figure 1:
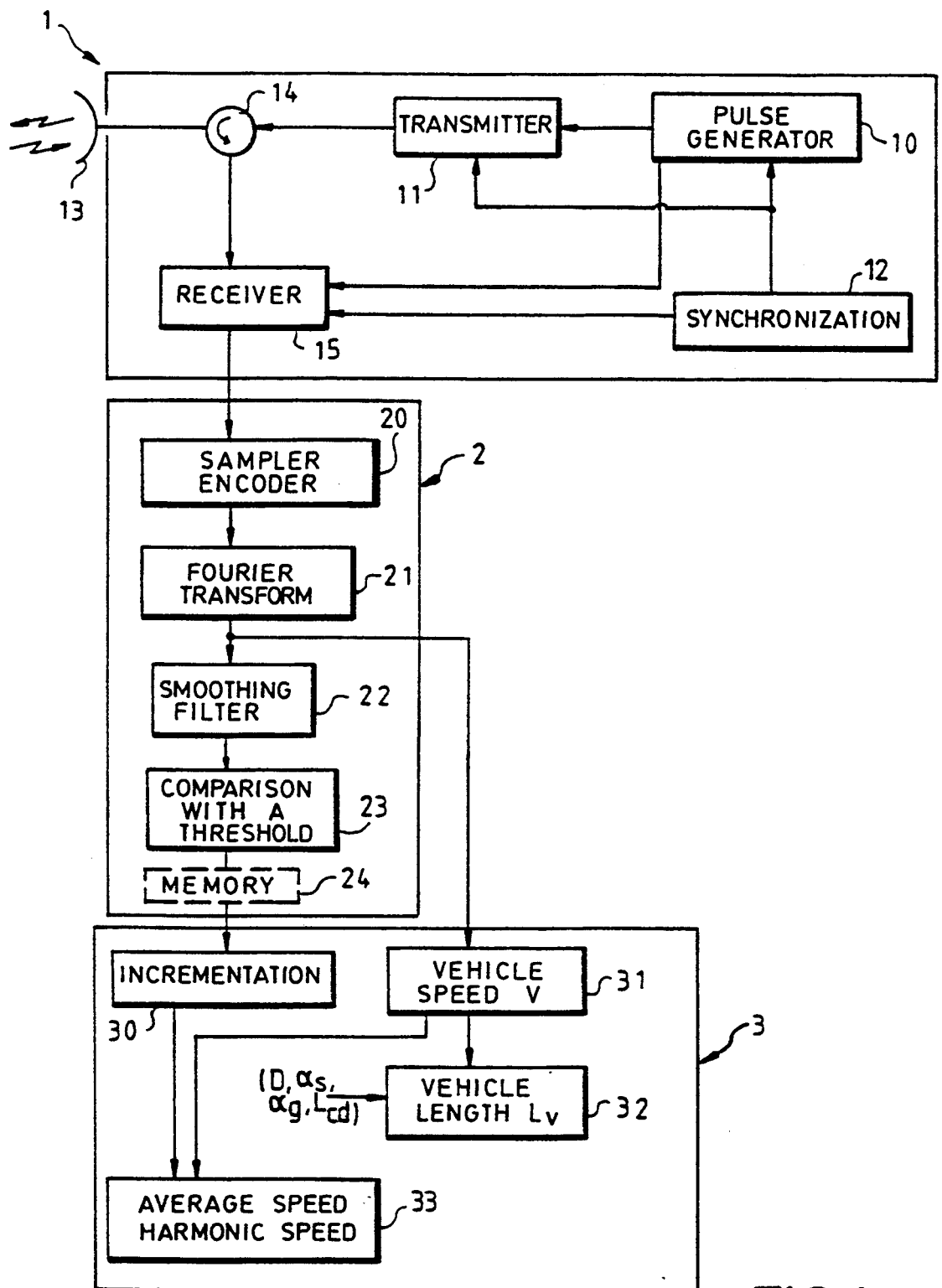
FIG. 1 is an example of a possible and non-restrictive construction of the system according to the invention.

FIG. 1 is an example of the construction of a checking system according to the invention:

The first essential characteristic of the system according to the invention is the use of a pulse modulated radar 1. This type of radar generates distance information for detected vehicles. This information may be used for observation of several traffic lanes using a single pulse modulated radar, positioned in a special manner that will be described later.

We will briefly describe the composition of this type of radar, that is well known to the expert in the subject and in itself does not form part of the invention.

As shown in FIG. 1, the pulse modulated radar 1 may conventionally consist of a carrier frequency $f_o$ pulse generator 10 transmitting generated pulses to a transmitter 11, that outputs carrier frequency $f_o$ pulses to an antenna 13 at the recurrence frequency $F_R$. In order to use a system according to the invention for checking automobile vehicular traffic, the radar preferably operates in millimetric waves and the frequency $f_o$ may lie within the 30 GHz–100 GHz interval. It is useful to choose $f_o$ either close to 35 GHz or to 94 GHz, values for which atmospheric absorption is lowest. In the non-restrictive example shown in FIG. 1, the same antenna 13 receives echo signals that it transmits to a conventional receiver 15 through a circulator 14.

Synchronization 16 enables the transmission-reception assembly to work correctly, in other words to receive echo signals only when the radar is not emitting pulses.

Figure 2A:
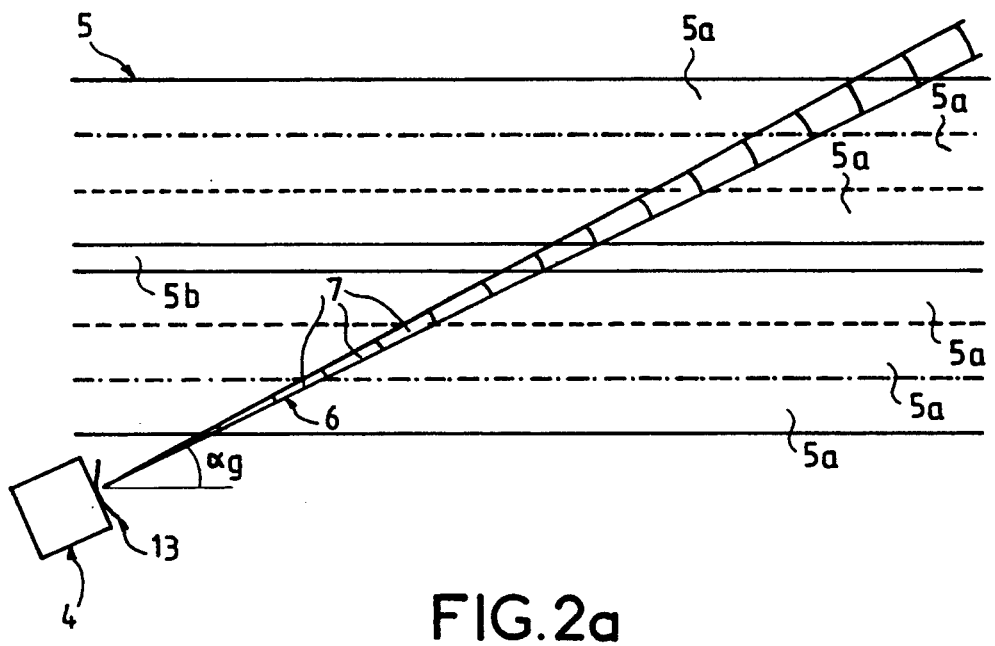
FIGS. 2a and 2b are top and side views respectively showing the shape of the radiation diagram for the system according to the invention.
Figure 2B:
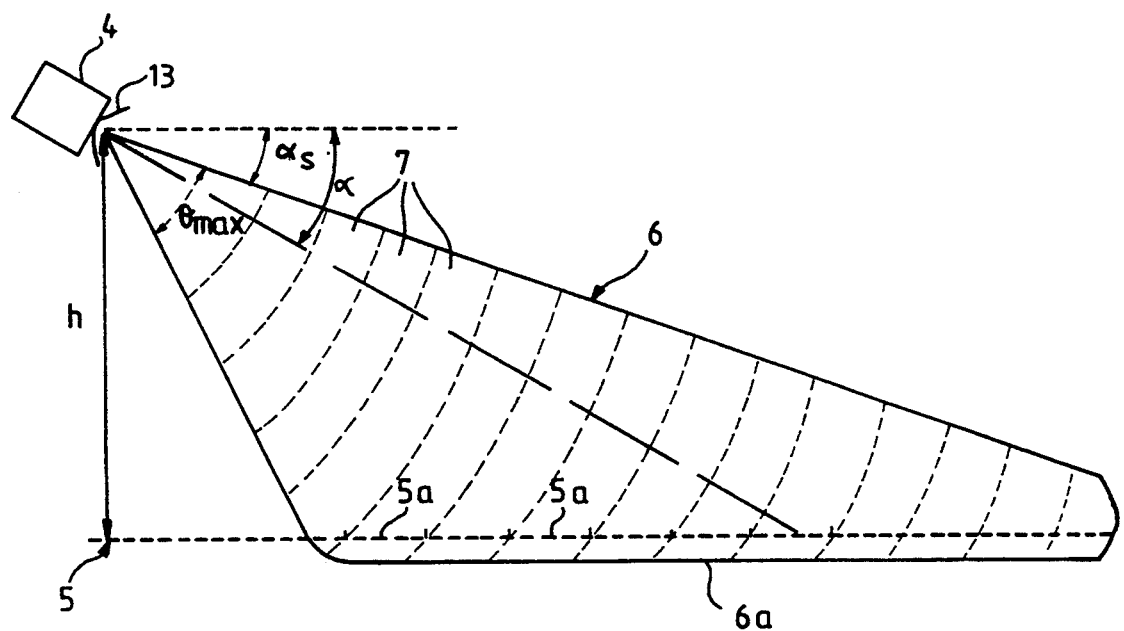

In accordance with the invention, the shape of the antenna 13 radiation diagram and its relative position with respect to the traffic lanes to be checked are shown in FIGS. 2a and 2b, that are top and side views respectively of radar coverage in the special but non-restrictive application of checking traffic on a motorway 5, for example with six traffic lanes 5a and a central earth reservation 5b.

In these figures, system 4 according to the invention is positioned on a side that is not common to the traffic lanes 5a. As shown in FIG. 2b, system 4 is positioned at a height, for example on a mast, such that the radar antenna 13 overlooks lanes 5a at a given height h. This height h will preferably be chosen to be higher than the maximum possible height of a motorway vehicle, such that it will be impossible for any masking between two vehicles that would be detected by the radar at the same time, if the vehicle closest to the radar is higher than the other vehicle.

The radiation diagram 6 must be narrow in plan (FIG. 2a) and sufficiently wide in elevation to cover all lanes.

It is also inclined at an elevation angle $\alpha_s$ and a plan angle $\alpha_g$, the values of the pulse width $\tau$, $\alpha_s$ and $\alpha_g$ being adjusted such that at least one range bin 7 is included in a lane 5a.

Figure 3:
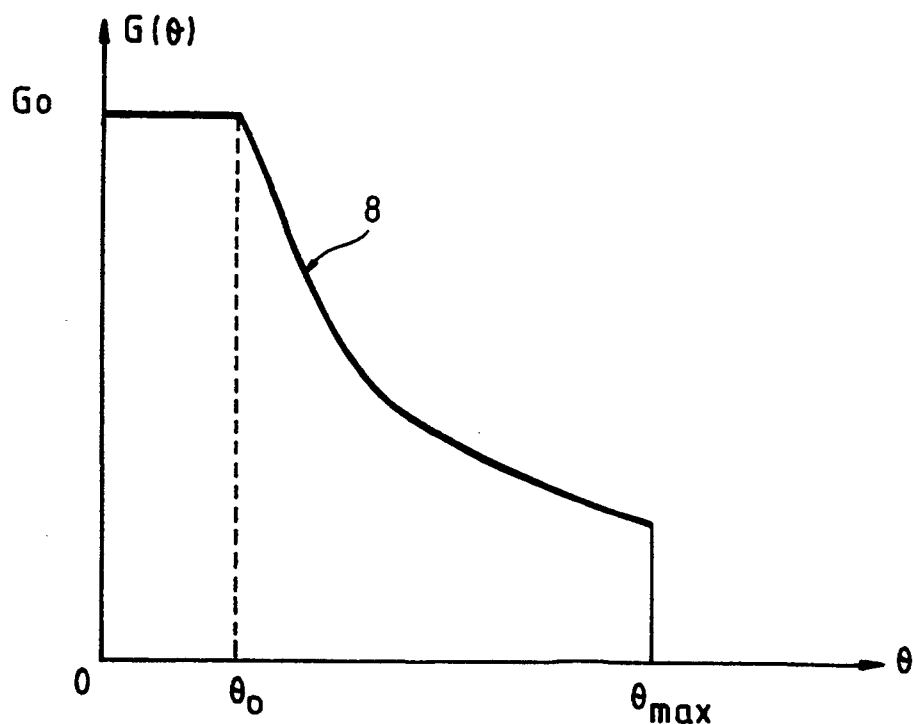
FIG. 3 shows a preferred elevation diagram between two angles $\theta_0$ and $\theta_{max}$ defined in FIG. 4, which is also a side view.
Figure 4:
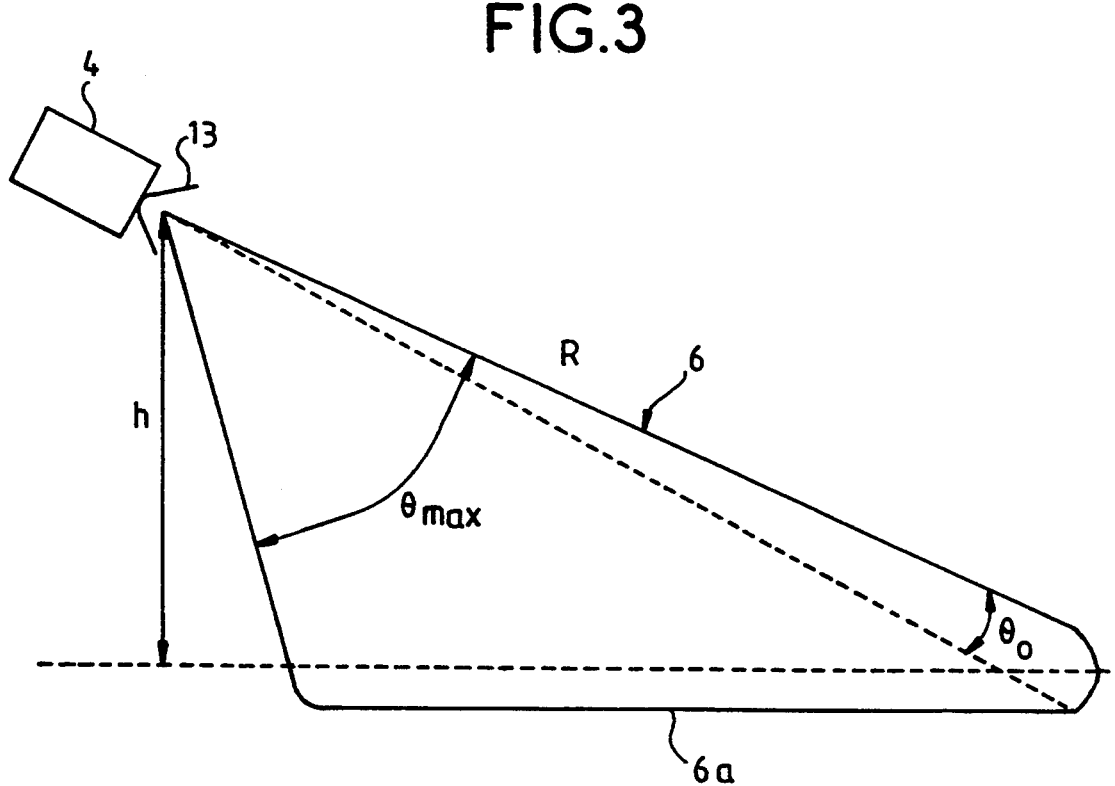

It is useful to make the shape of the radiation diagram in elevation similar to that shown on FIGS. 2b and 4, in which diagram 6 includes a zone 6a in which the gain is dependent on the distance and is practically parallel to the road 5 such that the amplitude of radar reception for the same vehicle detected at different distances is almost the same. It can be shown that the gain function $G(\theta)$ as a function of the elevation angle represented by curve 8 on FIG. 3 has the above property. For an elevation angle $\theta$ less than a predetermined angle, the diagram is identical to the diagram for a conventional antenna, in other words it has an almost constant gain $G_o$.

For an elevation angle $\theta$ within the $\theta_0$, $\theta_{max}$ interval, where $\theta_{max}$ is the elevation angle necessary for total coverage of the lanes, the gain varies as the square of the cosecant of $\theta$ according to the following relation:

$$G(\theta) = G_0 \frac{csc^2\theta}{csc^2\theta_0}$$

Returning to FIG. 1, echo signals output from the radar 1 receiver 15 are then transmitted to a signal processing module 2 enabling detection of vehicles in each traffic lane.

Figure 5A:
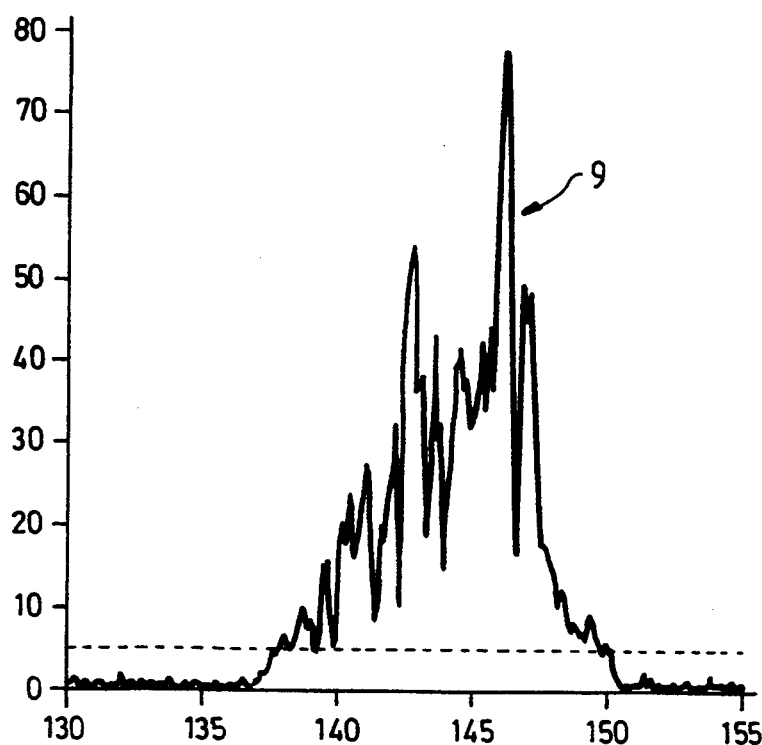
FIGS. 5a and 5b show the shape of signals output from the Fourier transform before and after the smoothing filter in the invention, respectively.
Figure 5B:
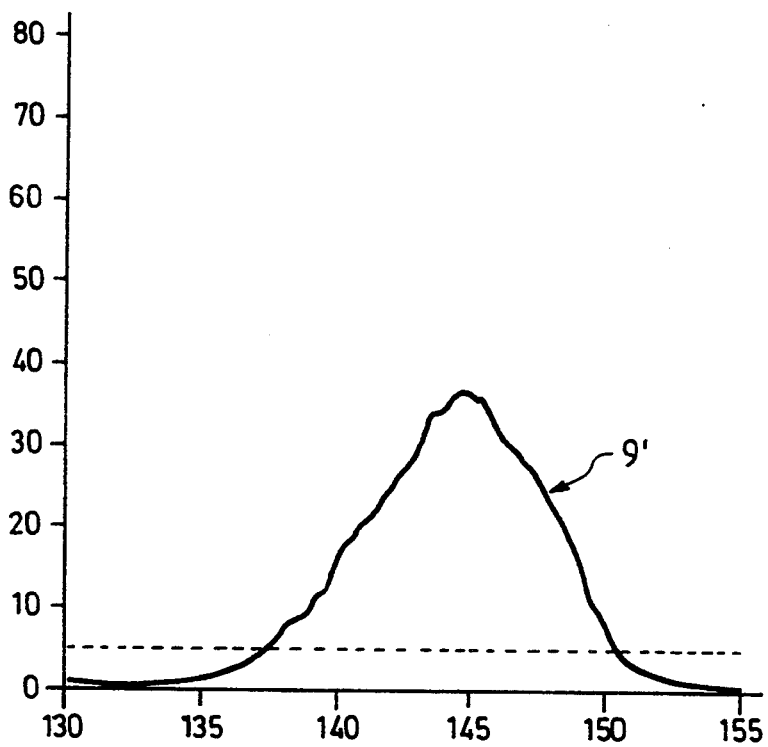

This signal processing module 2 comprises firstly a sampler-encoder 20 outputting an integer number of temporal samples of echo signals received, N, for example N=128, for each range bin 7 corresponding to a lane 5a. The temporal samples are then output to means 21 for computing the Fourier transform for these samples, and frequency samples output from computing means 21 are filtered in amplitude by a smoothing filter 22, in accordance with the invention. FIGS. 5a and 5b show an example of how the amplitude of the frequency signal varies with time before and after filtering 22 respectively, demonstrating the necessity for this filtering. Curve 9 on FIG. 5a is an example of what the system according to the invention produces at the output of Fourier transform computing means 21, when a single vehicle intersects the diagram.

This curve 9 shows fast and large amplitude variations such that simply comparing values with a given threshold s will detect several vehicles instead of one. The amplitude fluctuation illustrated by curve 9 is due to the natural fluctuation of the equivalent radar surface area of the vehicle in millimetric waves as the vehicle advances and the changing angle at which this vehicle is viewed in the time during which it passes through the beam. In order to remedy these fluctuations and consequently avoid false alarms, the system according to the invention includes a frequency signal amplitude smoothing filter 22 after the Fourier transform.

For example this filter may be an averaging filter that, when applied to a given frequency sample, replaces the amplitude of the sample by the average amplitude, using an even number of frequency samples taken on each side of said given sample.

The result of filtering is shown in curve 9' in FIG. 5b. It is now possible to compare the amplitude of frequency samples with a given threshold s, using comparison means 23 shown in FIG. 1. Each positive comparison represents detection of a vehicle in a lane. The threshold s may either be fixed in advance or may be adjustable.

After vehicles are detected in each lane using a single radar 1, the system according to the invention can calculate one or several traffic parameters. It is equipped with a parameter extraction module 3, for this purpose.

An initial example of a parameter to be extracted is the total number of vehicles per lane, or the total number detected during a given measurement period $T_{TOT}$. This number may be extracted using incrementation means 30, for example connected to comparison means 23, and increasing by one unit every time a vehicle is detected.

The speed V of each vehicle detected can also be calculated. This is done by incorporating first processing means 31 to calculate this speed into the extraction module 3, searching for the order f of the non-null frequency sample corresponding to the maximum amplitude of samples output from filter 22, and calculating the speed V by applying the following relations:

$$V(Km/h) = (f - N)\frac{F_4 \times c \times a_v}{2f_0 N \cos\alpha_g \cos\alpha_s} \quad \text{if } f > \frac{N}{2}$$

$$V(Km/h) = f\frac{F_R \times c \times a_v}{2f_0 N \cos\alpha_g \cos\alpha_s} \quad \text{if } f \leq \frac{N}{2}$$

where
$F_R$ = radar recurrence frequency
c = speed of light
and $a_v$ = conversion factor from m/s into kph, equal to 3.6.

With other computing means 32, the system according to the invention can also extract the detected vehicle length, $L_v$.

Figure 6:
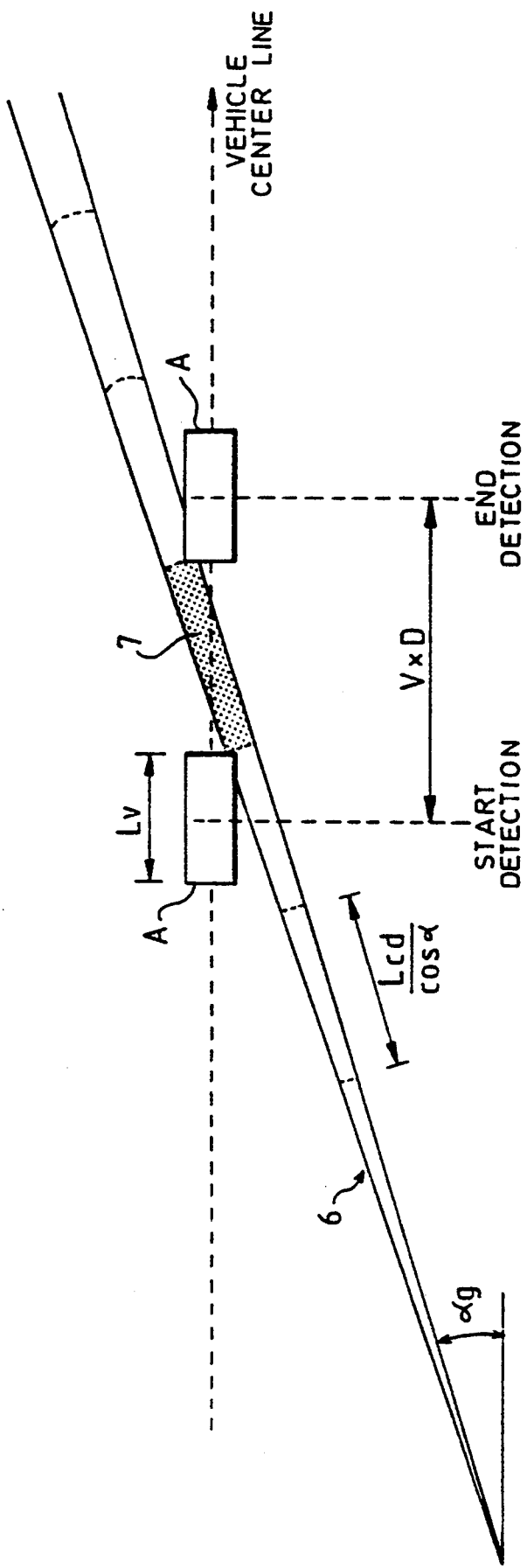
FIG. 6 shows the correction to be made according to the invention on the measured length of the vehicle to obtain its real length, $L_v$.

FIG. 6 shows that a correction has to be made on the length measured by radar 1. Diagram 6 of radar 1 detects the front of vehicle A when vehicle A intercepts the start of the range bin 7, and detection continues until this vehicle exits from this range bin. If $L_{cd}$ is the length of range bin 7, the error that it causes has to be taken into account. Thus other computing means 32 calculates the length $L_v$ of a detected vehicle starting from the speed V calculated by the first processing means 31 and using the following relation, $$L_v = V \times D - \frac{L_{cd}\cos\alpha_g}{\cos\alpha}$$

where D is the time during which the vehicle is present in the radiation diagram 6, and $\alpha$ is the radar-vehicle-ground angle shown on FIG. 2b.

The system can calculate a large number of interesting statistics based on the number of vehicles detected, their speed and length:

For example by defining a threshold vehicle length, it can calculate the density of trucks present in the area during the measurement period. It can use third processing means 33 to extract the global average speed $V_{ave}$, and the harmonic speed $V_{harm}$ of the traffic during a total measurement period $T_{TOT}$. The third processing means 33 does this by calculating the following relations:

$$V_{ave} = \frac{1}{n_v} \sum_{i=1}^{n_v} V_i$$

$$\frac{1}{V_{harm}} = \frac{1}{n_v} \sum_{i=1}^{n_v} \frac{1}{V_i}$$

where $n_v$ is the number of vehicles detected during the total period $T_{TOT}$, for example output by incrementation means 30, and $V_i$ is the speed of detected vehicle output from the first means 31.

The system in the invention that has just been described has many advantages over known systems:

It makes it possible to check several traffic lanes at the same time, using a single radar without any beam scanning, regardless of the traffic direction.

It is useful for the signal processing module 2 and parameter extraction module 3 to be in the form of computer programs. Calculations may be done in real time, or off-line if the system is equipped with storage facilities 24.

Installation, for example on a mast, adjustment and maintenance of the system are simple and the system is compact.

Also, performances of the system according to the invention are independent of the climatic conditions. It would also be feasible to install several systems at different locations on a road or motorway and to correlate the results output from each system using an information collection station to monitor traffic variations.

Finally the system may be positioned at critical points on a motorway network (entrance or exit roads, approaching a toll station, entrance to or exit from a layby, etc).

What is claimed is:

1. A system for the calculation of at least one parameter for checking vehicular traffic travelling on at least two traffic lanes, wherein said system comprises:

a pulse modulated radar placed on a side that is not common to said at least two lanes and overlooking said at least two lanes from a predetermined height h, said radar emitting pulses of a given carrier frequency $f_o$ having a pulse width $\tau$, with a radiation diagram that is narrow in plan and sufficiently wide in elevation to cover said at least two lanes and enable simultaneously checking of said at least two lanes, and inclined at an elevation angle $\alpha_s$ and plan angle $\alpha_g$, the values of $\tau$, $\alpha_s$, and $\alpha_g$ being chosen such that there is at least one range bin of said radar included in a lane, and said radar also receiving echo signals;

a signal processing module comprising a sampler-encoder for said received echo signals, means for computing Fourier transform of an integer number N of temporal samples output from said sampler-encoder for each range bin corresponding to one lane, a smoothing filter which smoothes amplitude of frequency samples output from said Fourier transform computing means, and means for comparing amplitudes of samples output from said smoothing filter with a given threshold to detect passage of vehicles in each lane; and a parameter extraction module which extracts said at least one parameter based on the output from said comparison means and samples output from said smoothing filter.

2. A calculation system according to claim 1, wherein the radiation diagram has a variable elevation gain $G(\theta)$ that is a function of the elevation angle $\theta$ and varies with the square of the cosecant according to the following relation:

$$G(\theta) = G_0 \frac{csc^2\theta}{csc^2\theta_0} \quad \text{for } \theta \in [\theta_0, \theta_{max}]$$

where:

$G_o$ = the practically constant gain of the radiation diagram for elevation angles $\theta$ less than $\theta_0$.

$\theta_o$ and $\theta_{max}$ are two predetermined elevation angles.

3. A calculation system according to claim 1, wherein said parameter is the number n vehicles travelling in each lane, and the extraction module contains incrementation means which increases by one unit each time a vehicle is detected.

4. A calculation system according to claim 1, wherein said at least one parameter is the speed V of a vehicle detected within a speed range $D_v$, and the extraction module further comprises first processing means for calculating said speed, wherein said first processing means searches for the order f of the non-null frequency sample corresponding to the maximum amplitude of samples output from said filter and calculates said speed V by applying the following relations:

$$V(Km/h) = (f - N)\frac{F_R \times c \times a_v}{2f_oN\cos\alpha_g\cos\alpha_s} \quad \text{if } f > \frac{N}{2}$$

$$V(km/h) = f\frac{F_R \times c \times a_v}{2f_oN\cos\alpha_g\cos\alpha_s} \quad \text{if } f \leq \frac{N}{2}$$

where $F_R$ = radar recurrence frequency,
c = the speed of light,
and $a_v$ is the conversion factor from m/s to kph, equal to 3.6.

5. A calculation system according to claim 4, wherein said at least one parameter is the length $L_v$ of the detected vehicle and said extraction module further comprises second processing means for calculating said length $L_v$ of the detected vehicle by using the following relation:

$$L_v = V \times D - \frac{L_{cd} \cos a_g}{\cos a}$$

where D is the time during which the vehicle is present in the radiation diagram, $a$ is the elevation angle of the vehicle, and $L_{cd}$ is the length of the range bin.

6. A calculation system according to claim 4, wherein said at least one parameter is average speed $V_{ave}$ and harmonic speed $V_{harm}$ of all vehicles detected during a total measurement period $T_{TOT}$ and said extraction module further comprises third processing means for calculating said average and harmonic speeds by application of the following relations:

$$V_{ave} = \frac{1}{n_v} \sum_{i=1}^{n_v} V_i$$

$$\frac{1}{V_{harm}} = \frac{1}{n_v} \sum_{i=1}^{n_v} \frac{1}{V_i}$$

where
  $n_v$ = the number of vehicles detected during the total period
  V = the speed of the detected vehicle.

7. A calculation system according to claim 1, wherein said smoothing filter is a low pass type filter which replaces amplitude of each sample output from said Fourier transform computing means with the average of said amplitude and amplitudes of an even number of samples taken on each side of said sampler.

8. A calculation system according to claim 1, wherein said processing module and said extraction module are run off-line by means of a storage means.

9. A calculation system according to claim 1, wherein the height h is greater than the maximum possible height of a vehicle.

* * * * *